United States Patent Office 3,274,261
Patented Sept. 20, 1966

3,274,261
PROCESS OF PRODUCING ORTHO-FORMIC ACID METHYL ESTER
Arnold Lenz, Cologne-Stammheim, and Karl Hass and Hans Epler, Luelsdorf-Feldmuehle, Post Troisdorf, Germany, assignors to Feldmuehle Papier- und Zellstoffwerke A.G., Dusseldorf-Oberkassel, Germany, a corporation of Germany
No Drawing. Filed Feb. 7, 1962, Ser. No. 171,557
Claims priority, application Germany, Feb. 16, 1961, F 33,216
9 Claims. (Cl. 260—615)

The present invention relates to a new and improved process of producing ortho-formic acid methyl ester.

It is known to prepare ortho-formic acid methyl ester by introducing a large excess of chloroform into the solution of a metal methylate in methanol while externally cooling the reaction mixture whereby the chloroform is added with such a speed that the reaction mixture is kept at the boiling point. The precipitated salt is dissolved by the addition of water and the solution is shaken with chloroform. The resulting chloroform solution is washed with water and dried over sodium sulfate. The ester is distilled off. However, this procedure is not only troublesome and complicated but the yield achieved thereby is not satisfactory. The resulting methyl ester which distills between about 95° C. and about 102° C. contains considerable amounts of impurities.

It is one object of the present invention to provide a simple and effective process of producing ortho-formic acid methyl ester which process is free of the disadvantages of the known process.

Other objects of the present invention and advantageous features thereof will become apparent as the description proceeds.

It was found that it is possible to overcome the above mentioned disadvantages of the known process when operating according to the present invention in such a manner that a solid, finely comminuted methylate of a metal selected from the group consisting of sodium, potassium, and mixtures thereof is suspended in an organic liquid which is substantially inert to the reaction mixture and in which said methylate is substantially insoluble and the required amount of chloroform is slowly and gradually added thereto at elevated temperature. The metal methylates which can be used in this process are methylates of the metals sodium, potassium, or their mixtures. Preferably the crude ester obtained in a preceding operation is used for suspending the metal methylate. It is also possible to dilute said crude ester with or to replace it by substantially inert organic liquids, in which the metal methylate is insoluble, for instance, hydrocarbons such as benzene or benzines of a suitable boiling point. Preferable a small excess of chloroform is used, the amount of this excess being not more than approximately 5% of the theoretical amount.

According to a preferred embodiment of the present invention the suspension of the metal methylate to which chloroform is added is heated to a temperature between about 50° C. and about 70° C. because, at room temperature, the reaction sets in not at all or only rather slowly. As soon as reaction has set in, cooling is usually required. Working up of the reaction mixture is effected in such a manner that the ester is distilled off from the resulting metal halogenide. The ester is sufficiently pure to be used for many purposes without further purification. Of course, it can further be purified by fractional distillation or in any other known manner.

The following examples serve to illustrate the present invention without, however, being limited thereto.

Example 1

100 kg. of finely pulverized sodium methylate are suspended in 120 kg. of crude 84% ortho-formic acid methyl ester. The suspension is heated to about 50° C. 74 kg. of dried chloroform are allowed to run into said suspension within one hour while stirring and cooling so as to keep the temperature between about 60° C. and about 80° C. Finally the ester used initially as suspending agent and the newly formed ester are distilled off from the precipitated sodium chloride. 197.3 kg. of crude 84% ester are obtained. The yield is 84% of the theoretical yield calculated for sodium methylate. 77.3 kg. of said crude ester are separated and the remaining 120 kg. of crude ester are again used as suspending agent for a new batch of sodium methylate. By fractional distillation of the crude ester, 65 kg. of pure ester of a degree of purity of more than 98% is obtained. Said pure ester has a boiling point between 103° C. and 105° C.

Example 2

100 kg. of finely pulverized potassium methylate are suspended in 138 kg. of crude 84% ortho-formic acid methyl ester. The suspension is heated to about 50° C. 50 kg. of dried chloroform are allowed to run into said suspension within one hour while stirring and cooling so as to keep the temperature between about 60° C. and about 80° C. Finally the ester used initially as suspending agent and the newly formed ester are distilled off from the precipitated potassium chloride, 194.6 kg. of crude 84% ester are obtained. The yield is 84% of the theoretical yield calculated for potassium methylate. 56.6 kg. of said crude ester are separated and the remaining 138 kg. of crude ester are again used as a suspending agent for a new batch of potassium methylate. By fractional distillation of the crude ester, 47.5 kg. of pure ester of a degree of purity of more than 98% is obtained. Said pure ester has a boiling point between 103° C and 105° C.

Example 3

100 kg. of finely pulverized sodium methylate are suspended in a mixture of 510 kg. of heptane with a boiling point of about 98° C. and 100 kg. of crude ortho-formic acid methyl ester. The suspension is heated to about 50° C. 74 kg. of dried chloroform are allowed to run into said suspension within one hour while stirring and cooling so as to keep the temperature between about 60° C. and about 80° C. Finally heptane and crude ester, both the ester used as suspending agent and the newly formed ester are separated from the precipitated sodium chloride by filtration. 3.8 kg. of pure ester are obtained by fractionating the organic solution. The pure ester is boiling between 100° C. and 105° C. Heptane and crude ester are reused as suspending agents in a new batch of sodium methanolate.

Example 4

100 kg. of finely pulverized sodium methylate are suspended in 220 kg. benzine with a boiling point about 175° C. The suspension is heated to about 50° C. 74 kg. of dried chloroform are allowed to run slowly into said suspension within one hour while stirring and cooling so as to keep the temperature between about 115° C. and about 125° C. The chloroform must be introduced deeply under the surface of the suspension in order to achieve complete reaction between the chloroform and the sodium methylate suspension. The formed ortho-formic ester is distilled off. By redistillation of the crude ester 14 kg. of the ester with a boiling point of 102° C. and 105° C. are obtained.

Of course, many changes and variations in the amount of the suspending agent, in the temperature at which the reaction is started, in the method of working up the reaction mixture and purifying the resulting crude ester, and the like can be made by those skilled in the art in accordance with the principles set forth herein and in the claims annexed hereto.

We claim:
1. In a process of producing ortho-formic acid methyl ester, the steps which comprise suspending a solid, finely comminuted methylate of a metal selected from the group consisting of sodium, of potassium and of mixtures thereof in an organic liquid which is substantially inert to the reaction mixture and in which said methanolate is insoluble, adding chloroform slowly and gradually to said suspension at an elevated temperature in the range of about 50° C. to about 125° C., and separating the ortho-formic acid methyl ester from the reaction mixture.

2. The process according to claim 1, wherein the ortho-formic acid methyl ester is separated by distillation from the reaction mixture.

3. The process according to claim 1, wherein a crude ortho-formic acid methyl ester produced by a preceding reaction is used as suspending agent for the metal methanolate.

4. The process according to claim 3, wherein the suspension of metal methylate in ortho-formic acid methyl ester is diluted by the addition of a hydrocarbon.

5. The process according to claim 3, wherein the suspension of metal methylate in ortho-formic acid methyl ester is heated before the addition of chloroform.

6. In a process of producing ortho-formic acid methyl ester, the steps which comprise suspending a solid finely pulverized metal methylate selected from the group consisting of sodium methylate, potassium methylate, and mixtures thereof in ortho-formic acid methyl ester, adding slowly and gradually about the equimolecular amount of chloroform to said suspension while maintaining the temperature between about 60° C. and about 80° C., and distilling off the resulting ortho-formic acid methyl ester and the ester used as suspending agent from the metal chloride.

7. In a process of producing ortho-formic acid methyl ester, the steps which comprise suspending a solid finely pulverized metal methylate selected from the group consisting of sodium methylate, potassium methylate, and mixtures thereof in ortho-formic acid methyl ester, adding slowly and gradually about the equimolecular amount of chloroform to said suspension while maintaining the temperature between about 60° C. and about 80° C., distilling off the resulting ortho-formic acid methyl ester and the ester used as suspending agent from the metal chloride, and recycling part of the distilled ester as suspending agent in a succeeding reaction.

8. The process according to claim 6, wherein the suspension of metal methylate is heated to a temperature of about 50° C. before adding the chloroform.

9. The process according to claim 6, whereby a diluting hydrocarbon is added to the suspension of the metal methylate in ortho-formic acid methyl ester.

References Cited by the Examiner
FOREIGN PATENTS
919,465  10/1954  Germany.

OTHER REFERENCES

Arnhold, M.: "Justus Liebig's Annalen der Chemie," vol. 240 (1887), pages 192–3.

Kaufmann et al.: Organic Synthesis, vol. V (1925), pages 55–58.

Sah et al.: Jour. Amer. Chem. Soc., vol. 54 (1932), pages 2964–2966.

LEON ZITVER, *Primary Examiner.*

B. HELFIN, H. T. MARS, *Assistant Examiners.*